United States Patent [19]

Mulaskey

[11] 4,102,822

[45] Jul. 25, 1978

[54] HYDROCARBON HYDROCONVERSION CATALYST AND THE METHOD FOR ITS PREPARATION

[75] Inventor: Bernard F. Mulaskey, Fairfax, Calif.

[73] Assignee: Chevron Research Company, San Francisco, Calif.

[21] Appl. No.: 708,804

[22] Filed: Jul. 26, 1976

[51] Int. Cl.$^2$ ............... B01J 21/04; B01J 23/84; B01J 23/64; B01J 27/04

[52] U.S. Cl. ............... 252/465; 252/439; 252/466 J; 252/466 PT; 252/467; 252/470; 252/472; 252/477 R; 208/136; 208/216; 252/468; 252/469; 252/473; 208/251 H; 208/254 H

[58] Field of Search ............ 252/439, 465, 466 J, 252/466 PT, 470, 477 R, 467, 472, 468, 469, 473

[56] References Cited

U.S. PATENT DOCUMENTS

| | | | |
|---|---|---|---|
| 2,409,494 | 10/1946 | Keating | 252/430 X |
| 3,162,607 | 12/1964 | Burbidge et al. | 252/477 R |
| 3,377,269 | 4/1968 | Bloch | 252/465 X |
| 3,630,888 | 12/1971 | Alpert et al. | 252/465 X |
| 3,709,832 | 1/1973 | Ao | 252/429 R |
| 3,770,617 | 11/1973 | Riley et al. | 208/216 |
| 3,873,470 | 3/1975 | Conway et al. | 252/465 |
| 3,898,155 | 8/1975 | Wilson | 208/251 H |

*Primary Examiner*—W. J. Shine
*Attorney, Agent, or Firm*—D. A. Newell; R. H. Davies; D. L. Hagmann

[57] ABSTRACT

A catalyst composition, a method for its preparation and a hydrotreating process using same. The catalyst comprises a rigidly interconnected pack of irregularly shaped particles having an average diameter below 0.15 mm. Among the particles and throughout the pack are access channels comprising interconnected macropores having diameters in the 0.1 to 15 micron range which contribute at least 5 percent of the pore volume. The particles comprise materials selected from the group consisting of at least one refractory oxide component and one hydrogenation component. For each 100 parts of the oxide component the composition contains, in parts by weight, an amount of the hydrogenating component, calculated as metal, in the range from 0.1 to 50 parts.

29 Claims, 5 Drawing Figures

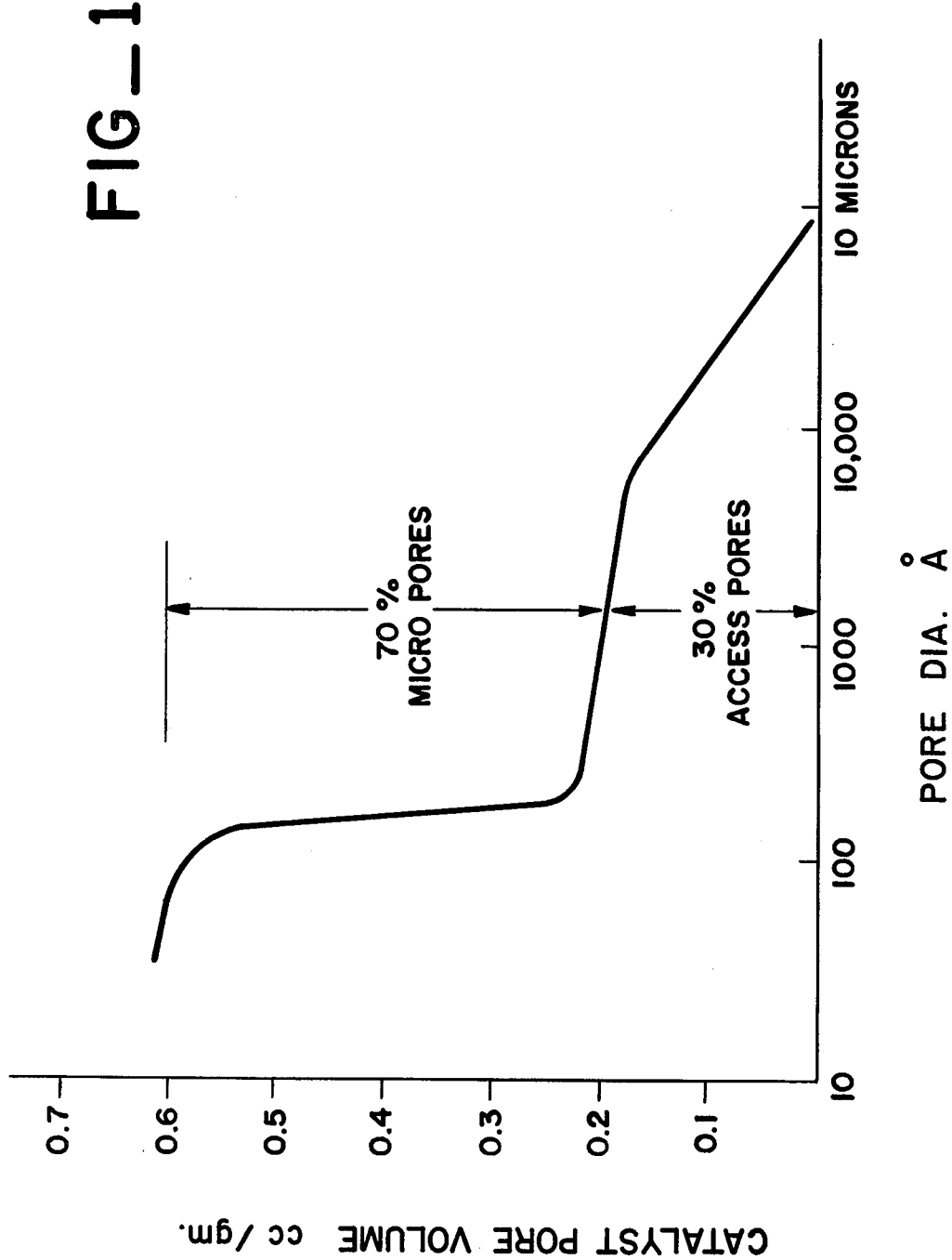

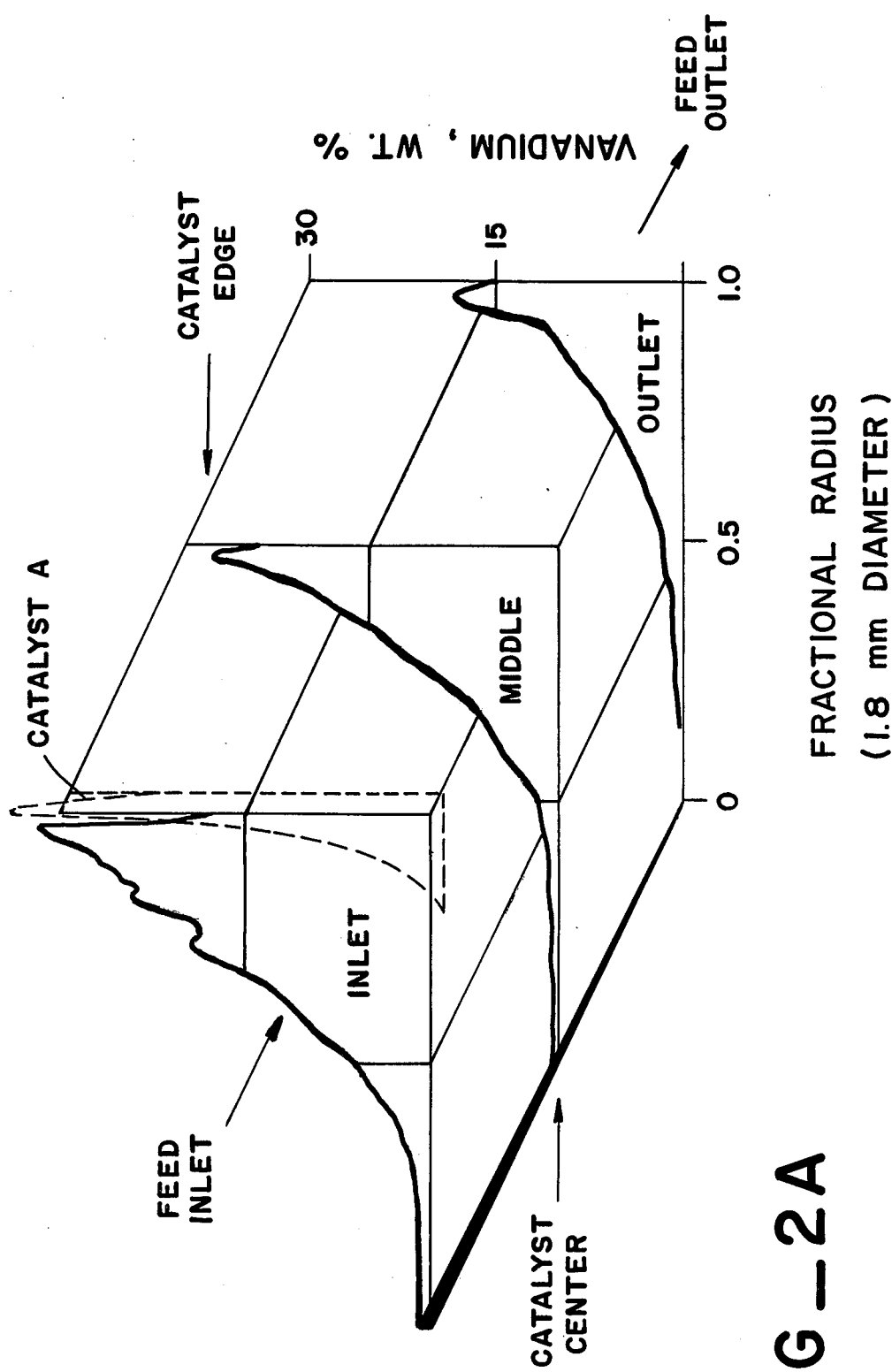
FIG_2A

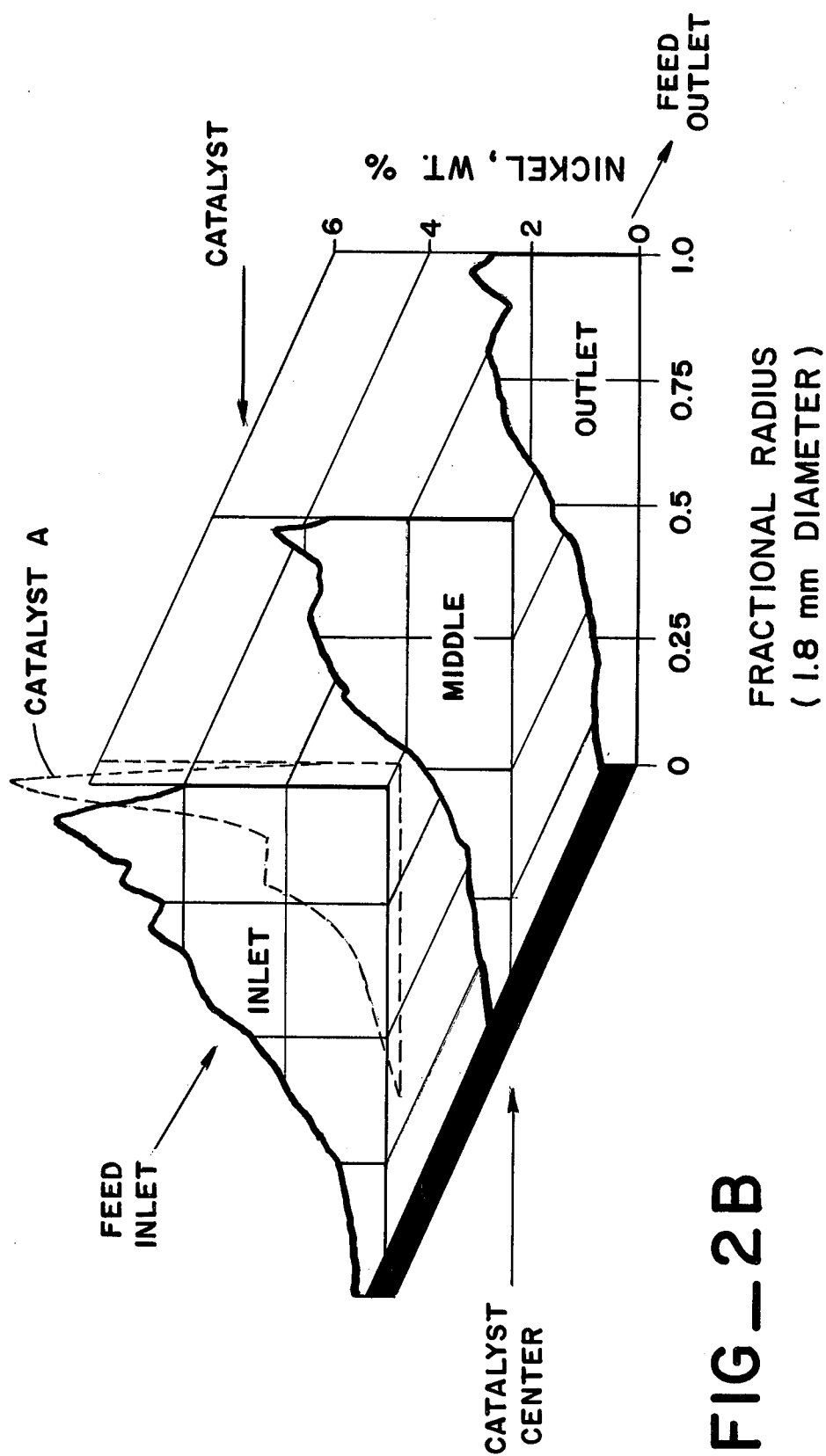
FIG_2B

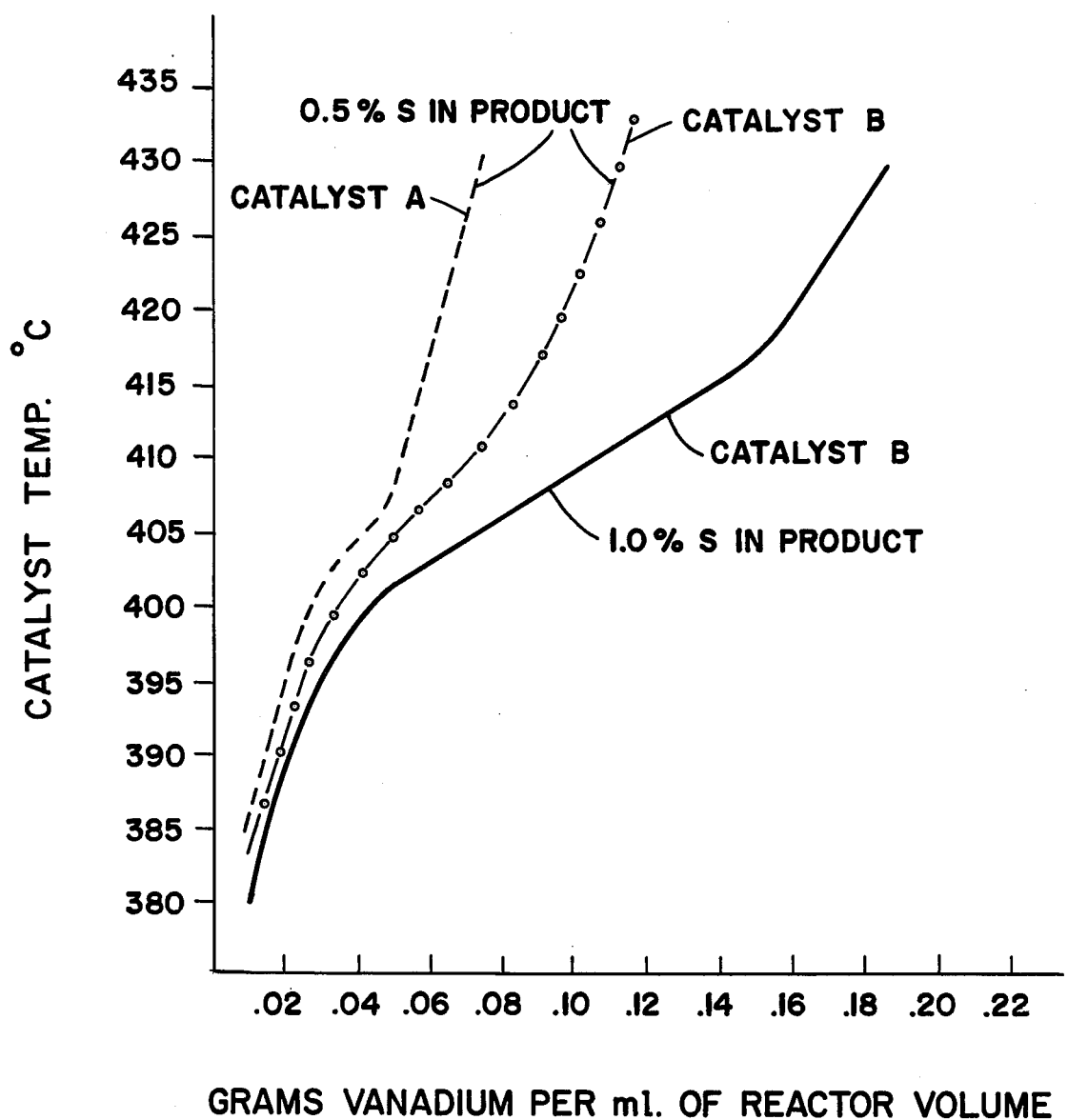
FIG_3

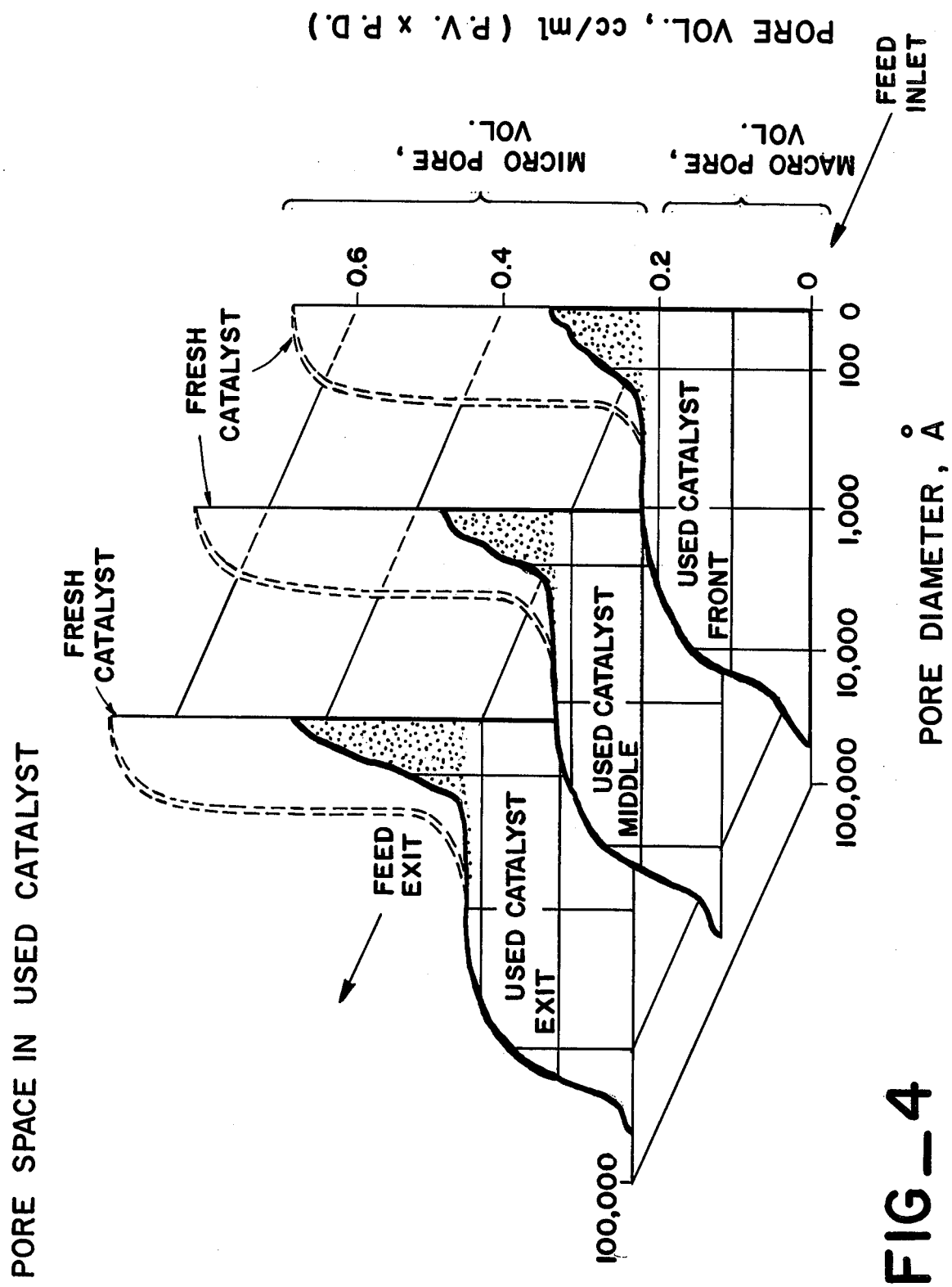
FIG.—4

4,102,822

HYDROCARBON HYDROCONVERSION CATALYST AND THE METHOD FOR ITS PREPARATION

BACKGROUND OF THE INVENTION

This invention relates to a novel catalyst composition and to its preparation and use. More particularly, it relates to a composition comprising a rigidly interconnected pack of irregularly shaped particles comprising a refractory oxide component and a hydrogenating component.

In the catalyzed processing of high-molecular-weight hydrocarbons, for example, the removal of metal contaminants from heavy hydrocarbon feedstocks, a number of costly inconveniences are experienced, including (1) a reaction diffusion limitation and (2) are undesirably low catalyst utilization factor. The diffusion limitation is a consequence of high-molecular-weight species normally present in the feedstock and of an optimum micropore size range required for the working pores of the catalyst. The catalyst utilization effect is a consequence, in the main, of a combination of metal and coke deposition in the working pores aggravated by diffusion limitations, for example, the blanking off of unused or incompletely used catalyst pore volume by metal and coke deposits under conventional hydrocarbon demetalization conditions. There is a need for a catalyst suitable for use in high-molecular-weight hydrocarbon treating, for example, demetalation, exhibiting reduced diffusion limitation effects (improved effectivities) and an improved overall utilization.

SUMMARY OF THE INVENTION

A catalyst composition especially suitable for use in catalyzed treating of a hydrocarbon feedstock, especially one which contains an appreciable content of high-molecular-weight hydrocarbons, has now been found. This catalyst is a composition comprising a rigidly interconnected pack of irregularly shaped particles of which (1) less than 5 weight percent thereof have average diameters in the range 0.15 to 1.3 mm, (2) at least 10 weight percent thereof have average diameters in the range above about 0.1 micron and (3) the remainder thereof have average diameters in the range below 0.15 mm, said pack having a pore volume of at least 0.065 cc per cc of the pack and having access channels among said particles throughout the pack, said channels comprising interconnected macropores having a diameter as measured by mercury porosimetry in the range 0.1 to 15 microns, and said macropores contributing at least about 3 percent of said pore volume; said particles comprising materials selected from the group consisting of at least one refractory oxide component and at least one hydrogenating component, said refractory oxide component being further selected from the group consisting of the oxides of the metals of Groups II, III and IV, said hydrogenating component being further selected from the group consisting of the metals, oxides and sulfides of the elements of Groups VIB and VIII; and said composition containing, in parts by weight, for each 100 parts of said refractory oxide component an amount of said hydrogenating component, calculated as metal, in the range from about 0.1 to 50, preferably 0.1 to 30, parts.

A further aspect of the invention is a method for preparing catalytic compositions, including the above-described composition by steps including:

(1) preparing a dough-like mixture by admixing water, a cohesive component and a solid component, said mixture, based upon 100 parts of the solid in parts by volume (volume actually occupied by particles, particle volume) thereof, containing an amount of water in the range from about 30 to 200 volumes, and an amount of the cohesive component, based on parts by weight per 100 parts of water, in the range from about 0.2 to 30 parts; said cohesive component being selected from the group consisting of organic hydrocolloid-forming compounds and mixtures thereof having a molecular weight above about 1000, said comprising carbon, hydrogen and oxygen, and may contain nitrogen and/or halogen, said solid component comprising a mixture of irregularly shaped particles of which (1) less than 5 weight percent have average diameters in the range 0.15 to 1.3 mm, (2) at least 10 weight percent have average diameters in the range above about 0.1 micron and (3) the remainder have average diameters in the range below 0.15 mm, said particles comprising materials selected from the group consisting of at least one refractory oxide component and at least one catalytic agent component or precursor thereof, said refractory oxide component being further selected from the group consisting of the oxides of the metals of Groups II, III and IV, said catalytic component or a precursor thereof comprising at least one catalytic agent or a precursor thereof selected from the group consisting of the elements and compounds of the elements of Groups I, V, VI, VII and VIII, preferably a hydrogenating component selected from the group consisting of the metals, oxides and sulfides of the elements of Groups VIB and VIII; and said solid component containing, in parts by weight, for each 100 parts of said refractory oxide component an amount of said catalytic component or precursor thereof, calculated as the element, in the range from about 0.1 to 50 parts, preferably 0.1 to 30 parts;

(2) shaping said dough-like mixture; and (3) drying and calcining the shaped mixture at a temperature in the range from about 20° C to 950° C.

In an alternative preparation, the dough-like mixture employed in the above-described method contains as the solid component only the refractory oxide component and after the drying and calcining step, the resulting pack of particles is impregnated by conventional means with the hydrogenating component or a precursor thereof, followed by a second drying and calcining step.

In a yet further aspect of the invention, a hydrocarbon feedstock containing at least an appreciable amount of a high-molecular-weight hydrocarbon component is treated in a process comprising (I) contacting in a reaction zone a mixture containing said feedstock and hydrogen gas with a hydrotreating catalyst having a composition as characterized in Claim 1, said contacting including (1) a temperature in the range from about 200° to 540° C, (2) a total pressure in the range from about 1 to 300 atmospheres, (3) a hydrogen partial pressure in the range from about 0 to 200 atmospheres (1 to 200 atmospheres for hydroconversions), (4) a hydrogen rate in the range from about 0 to 9000 standard cubic liters of hydrogen per liter of feedstock (93 to 9000 SCL/L for hydroconversions), and (5) a liquid hourly space velocity in the range from about 0.1 to 25; and (II) withdrawing the resulting treated product from said reaction zone.

Yet further contemplated aspects of the invention herein include:

(1) the use in general of the composition herein as a catalyst in the hydroprocessing or hydrotreating of hydrocarbon feedstocks containing at least 5, preferably at least 10, weight percent of diffusion limiting components (components having a normal boiling point above 315° C); (2) combinations of at least two hydrocarbon hydroprocessing, catalytic cracking, and/or hydrotreating process stages carried out under satisfactory conditions, at least one of said stages employing a catalyst composition of the invention herein and the balance of said stages employing one or more conventional hydrocarbon processing catalysts, for example, a conventional catalytic cracking catalyst or a conventional catalyst containing at least one hydrocarbon hydrogenating component, especially ordinary hydrocarbon hydrogenating catalyst components selected from Groups VIB and VIII of the Periodic Chart of The Elements; representative multistage (combination) processes include (a) a first stage primarily directed to metal-contaminant (conventional crude oil metal contaminants) removal using a catalyst herein, followed by (i) a hydrodesulfurizing stage, or (ii) a catalytic cracking stage, or (iii) a hydrocracking stage, or (iv) a reforming stage, or (v) a hydrodenitrifying stage, or (vi) a second demetalizing stage; (b) a first stage directed primarily to sulfur and metal removal using a catalyst herein, followed by (i) a hydrodemetallizing stage, or (ii) a reforming stage, or (iii) a catalytic cracking stage, or (iv) a hydrodenitrifying stage, or (v) a hydrocracking stage, or (vi) a second desulfurizing stage; (c) a first stage directed to adsorbing hydrogen sulfide and/or thiols and thiophenes from a distillate containing diffusion limiting components using a catalyst carrier herein containing at least one sulfadsorptive component comprising copper, zinc, chromium, iron and cobalt, followed by a reforming stage; and (d) the use of a catalyst composition herein as a guardbed for a subsequent hydrocarbon processing stage.

The foregoing and other aspects of the invention are described in the description and examples to follow.

BRIEF DESCRIPTION OF THE DRAWINGS

FIG. 1 is a curve showing the bimodal pore size distribution of a catalyst of the invention.

FIGS. 2A and 2B are curves showing the comparative volumetric distribution in demetalation service of vanadium and nickel, respectively, in a used catalyst of the invention and of the prior art, the nickel and vanadium content comparisons being for the inlet portions only.

FIG. 3 is a curve showing the comparative activities and metal capacities of the aforementioned catalysts.

FIG. 4 is a curve showing pore diameter and pore space distribution for a new and used catalyst of the invention.

EMBODIMENT OF THE INVENTION

In a preferred embodiment of the invention a porous catalyst thereof having a bimodal pore size distribution is used to catalyze the removal of metal contaminants from an atmospheric residuum under hydrodemetalizing conditions.

In the preparation of the catalyst by the method herein, a calcined refractory oxide carrier material characterized as follows:

| Oxide component | $Al_2O_3$ |
|---|---|

| -continued | |
|---|---|
| Surface area, m$^2$/g | 115–200 |
| Pore Volume, cc/g | 0.5–0.85 |
| Pores in dia. range, % of PV | |
| <40A | <5 |
| <80A | <10 |
| 80–150A | >85 |
| 150–1000A | <5 |
| >1000A | <1 | is impregnated with an aqueous solution of cobalt phosphomolybdate in an amount sufficient to contain, in parts by weight, about 4 and 15 parts of cobalt and molybdenum, respectively, per 100 parts of alumina. The impregnated alumina is then dried and pulverized to a mixture of particles having average diameters in the range below about 0.15 mm. Depending upon the loading (0.1 to 30 parts per 100 parts of carrier) of the carrier with the cobalt phosphomolybdate, the particles will exhibit surface area, and pore volume characteristics which are roughly from about 5 to 30 percent below the corresponding values for the carrier used. The pore size distribution (percent pore volume versus pore diameter) will be substantially the same for the impregnated particles as for the carrier per se.

Next, a dough-like mixture is prepared by thoroughly admixing the above prepared particles with water and wheat flour. For each 100 parts by weight of the particles about 100 parts of water and 10 parts of the flour are required. The resulting mixture is then extruded using an orifice having a 1.8 mm diameter. The extrudate can be cut to a desired length, for example 3.0 mm, dried and calcined at about 455° C to constant weight in air. The resulting catalyst is a rigidly interconnected pack of irregularly shaped particles which has a total pore volume of about 0.6 cc/g of which about 68 percent is in micropores and about 32 percent is in interconnected access pores, macropores surrounding the particles (see FIG. 1). It is an excellent hydrocarbon hydroprocessing catalyst and one especially suitable for use in removing metals from a contaminated hydrocarbon feedstock as is demonstrated in the examples below.

The Catalyst

The catalyst of the present invention is a plurality of irregularly shaped particles closely and rigidly grouped, bunched, packed or clustered together. Among the particles are access channels which provide a pathway for a hydrocarbon feedstock and hydrogen into and out of contact with the particles and with one or more catalytic agents present in the micropores (working pores) in the interior of the particles. In particular these access channels, which are interconnected macropores having diameters, in general, in the range 0.1 to 15 microns, provide access for high molecular weight components of a hydrocarbon feedstock to micropores present in the particles. These channels are substantially uniformly distributed throughout the pack. This is in direct contrast to particle-containing agglomerates prepared by pelleting or pilling means using compressive or compactive force. The forceful agglomeration in tabletting or pilling produces a surface and neighboring interior thereof which contains little or no satisfactory access channels.

The term "pore volume" of the catalyst composition as used herein refers to the volume provided by the macropores (pores having average diameters in the range 0.1 to 15 microns) and the micropores (pores having average diameters below 0.1 micron) where the pore volume fraction for the pores in the 50 Angstrom to 15 micron diameter range is determined by the ordinary mercury porosimetry method (see U.S. Pat. No. 3,853,789) and the pore volume fraction in the 0 to 50 Angstrom range is determined by the ordinary BET nitrogen adsorption method (Brunauer, Emmett & Teller, JACS 60,309 (1938). For convenience, and to avoid the chore of determining the wetting angle, which changes in mercury porosimetry determinations depending upon the material being measured, the pore size distribution in a catalyst or carrier for pores in the diameter range 50 to 250 Angstroms is measured (1) using the BET nitrogen adsorption method and (2) using the mercury porosimetry method. The values obtained for this range by the BET method are not subject to the aforementioned wetting angle variation and are taken as the standard. These are used to calibrate the mercury porosimetry method, thereby determining, using conventional equations, the mercury contact angle and the surface tension values required to determine for the material being measured, the pore size distribution for the whole of the mercury porosimetry range, i.e., for pores having a diameter of from about 50 Angstroms to 15 microns and higher. The nitrogen method is inappropriate for the measurement of pore size distributions for pores having diameters greater than about 300 Angstroms. For aluminous carriers, the mercury contact angle is usually about 2.4435 radians and the surface tension is about 473 dynes per centimeter.

The pore volume of the catalyst herein may vary widely depending upon whether the particles making up the catalyst are porous or non-porous. In the latter case, the access pores provide the total pore volume which should be at least 0.065 cc per cc of the composition. Where the particles are porous, the pore volume provided thereby may vary widely and in general is in the range 0.065 cc to 0.8 cc per cc of the catalyst, preferably, in the range 0.3 to 0.6 cc/cc of catalyst.

The content of the macropores among the particles required for a satisfactory catalyst herein varies depending, in general, upon the particles contained therein and the sizing of the macropores. Usually, relatively little or no catalysis is effected in the macropores. These pores in the main merely provide access for the feed, hydrogen and hydrocarbon, to the particles in the pack. Therefore the fraction of the pore volume in interparticle access pores should be sufficient to reasonably minimize diffusion limitation effects yet not be so large as to unduly reduce the content of working pores in the catalyst. In general, a satisfactory content of interparticle macropores is in the range from about 3 to 45 percent of the total pore volume of the catalyst composition, preferably 5 to 30 percent, and more preferably 10 to 20. It is to be understood that the particles per se may also contain macropores, intraparticle pores, and hence the contribution of access pores by the interparticle macropores may desirably be in the lower portion of the above ranges. The catalyst preparation method herein causes no appreciable change, as a practical matter, in the pore volume and pore size distribution of the particles per se. Thus the interparticle macropore content of a pack of particles of the invention is readily obtained by difference. This advantage is in direct contrast to the result experienced in producing a catalyst by tabletting or pilling where the forming operation destroys macropores and micropores as a result of the great pressure and heat generated in the operation. Moreover, in tabletting, a pressure gradient is created throughout the tablet, being greatest at the periphery thereby causing substantial collapse of macropores where most needed, that is at the outer tablet surface and in the contiguous interior volume.

The diameter of suitable access pores for the catalyst herein may vary widely depending in the main upon the relative amount and kinds of high-molecular weight and/or metals-containing molecules in the hydrocarbon feed to be processed and/or upon the desired conversion. In general, pores sized in the diameter range 0.1 to 15 microns, macropores, provide satisfactory access. Preferably, access pores are sized in the range 0.2 to 10, more preferably 0.2 to 5, micron range. The determination of the sizing of access pores herein is by conventional mercury porosimetry methods as applied to an unused catalyst or alternatively, as applied to a calcined carrier suitable for use in the preparation of the catalyst.

The micropore content of the catalyst composition herein is, for practical purposes, provided in the main by the particles per se which are used in its preparation while, as described above and below, interparticle macropores or access pores are introduced into the catalyst composition by the preparative method. Therein are particular advantages of the invention (1) the difficult operation of simultaneously maximizing a specific micropore size and content and of introducing access pores into a catalyst composite is avoided, (2) by using mixtures of particles having different micropore distributions a tailored catalyst having a polymodal pore size distribution is produced and (3) by using particles substantially free of macropores and optimizing the interparticle macropore content of a pack of the particles, reaction zone space is more efficiently utilized.

The micropore content and the pore size distribution thereof of the catalyst herein may vary widely. Where the particles are non-porous or essentially so, the micropore content will be substantially nil. Broadly, micropore content is in the range from about 0 to 97 percent of the total pore volume. Usually, and preferably, the fraction of the total pore volume of the composition which is in micropores varies depending upon the particles used in the preparation thereof and upon the macropore content required to reduce diffusion limitation effects. In general, a desirable content of micropores is in the range 55 to 97, preferably 70 to 95 and more preferably 80 to 90 percent of the total pore volume.

The size distribution of the pores constituting the micropore volume of the catalyst composition may vary widely depending in the main upon the catalysis desired. For example, where catalyzed hydrodesulfurizing is the objective and the feed contains an appreciable high molecular weight component and little or no metals contaminants, a high content of micropores in the 50 to 120 Angstrom diameter range is especially desirable, for example at least 50, preferably at least 75, percent of the fraction of the pore volume in micropores should constitute such sized pores. On the other hand, where the feedstock to be hydrodesulfurized also contains at least 10 ppm by weight of the metals contaminants ordinarily present in crude oil, a micropore size distribution in the 80 to 150 Angstrom diameter range is especially desirable. Where such a feed containing sulfur and metals contaminants is to be hydrotreated with substantial concurrent hydrocracking and/or concurrent hydrodesulfurizing of relatively low molecular weight feed or product components, additional micropores ranging up to 40 Angstroms in diameter, for example as provided by particles of a suitable molecular sieve component should also be present in the catalyst composition, i.e., a catalyst having a tailored and polymodal pore size distribution. Catalytic hydroprocessing, or catalytic cracking, or hydrotreating of hydrocarbons is believed, in general, to be effected by micropores sized in the diameter range below about 300 Angstroms and above 5 Angstroms. The content of these pores, that is of working pores, desirably should constitute at least the major portion of the pore volume of the catalyst composition herein which is in micropores.

The presence in a catalyst herein of an appreciable amount of relatively small micropores may be undesirable because such pores are especially susceptible to or a cause of a problem believed to be aptly described as pore-mouth plugging. Where this problem is experienced in the catalyzed hydroprocessing of heavy hydrocarbon feedstocks, the effectivity of the catalyst is usually markedly reduced, especially in the absence in the catalyst of a satisfactory content of suitable access pores. Micropores susceptible to pore-mouth plugging usually have diameters in the range below about 80 Angstroms, and more often in the range below 40 Angstroms. In a preferred aspect the catalyst herein has a content of micropores sized in the range below 80 Angstroms, which is less than 10 percent of the total pore volume. More preferably, this catalyst has a content of micropores sized in the range below 40 Angstroms, which is less than 5 percent of the total pore volume.

The surface area of the catalyst composition herein varies widely depending upon the usual factors, including pore volume and average pore diameter. In general, a satisfactory catalyst has a surface area in the range from about 0.1 to 500, and higher, square meters per gram. Preferred catalysts have a surface area in the range 115 to 300, preferably 120 to 200, square meters per gram.

The particles constituting the pack or cluster which is the composition herein may vary widely depending upon several variables, including (1) compositional factors and (2) a size factor.

The particles comprising the composition of the invention may vary widely depending upon the desired catalyst, carrier plus catalytic agent. In general, the particles may be composed of synthetic or natural inorganic refractory oxides (catalyst carrier materials) or the oxides plus catalytic agents or precursors therefore as customarily employed in the chemical catalyst art (see, for example (1) "Catalysis, Inorganic and Organic" by Messrs. Berkman, Morrell and Egloff, and (2) "Catalysis", Vols. I-VII, edited by P. H. Emmett, Rheinhold Publishing Corporation, N.Y.), including additives therefore ordinarily known and used in the art as promoters and the like, that is, at least one catalytic agent or precursor thereof selected from the group consisting of the elements and compounds of the elements of Groups I, V, VI, VII and VIII. Preferably the particles herein are materials selected from the group consisting of at least one refractory oxide component and at least one hydrogenating component, the refractory oxide component being further selected from the group consisting of the oxides of the metals of Group II, III and IV, and the hydrogenating component being further selected from the groups consisting of the metals, oxides and sulfides of the elements of Groups VIB and VIII of the Periodic Chart of the Elements, with the proviso that the composition contains, in parts by weight, for each 100 parts of the refractory oxide component an amount of the hydrogenating component, calculated as the element, in the range from about 0.1 to 50 parts. Preferably, the particles are composed of a pulverable refractory oxide component containing (as by impregnation, coprecipitation, or the like) therein the hydrogenating component or having the hydrogenation component disposed thereon substantially as a porous coating. More preferably the particles are calcined (480°–925° C) pulverable oxides.

Representative refractory oxide components include alumina, magnesia, calcium oxide, titania, zirconia, silica, zinc oxide, barium oxide, kieselguhr, bauxite, diatomaceous earth and the like, natural and synthetic crystalline aluminosilicates and mixtures thereof. Preferred particles contain at least one pulverable refractory oxide of the metals of Groups II, III and IV and at least 10, more preferably at least 25, weight percent of alumina. Most preferably, the refractory oxide is alumina.

Representative hydrogenating components include individually and in combination the metals, sulfides and oxides of molybdenum, tungsten, iron, cobalt, nickel, vanadium, platinum, palladium and the like. Preferred hydrogenating components are cobalt, nickel, molybdenum and tungsten and two-component mixtures thereof.

The sizing of the particles in the rigid pack, cluster or bunch of the composition herein varies over a range and is dependent, in general, upon the desired size and content of the interparticle macropores required for the reduction and/or elimination of diffusion problems. In general, a satisfactory catalyst is produced by the method herein when of the particles (1) less than 5 weight percent thereof have average diameters in the range 0.15 to 1.3 mm, (2) at least 10 weight percent thereof have average diameters in the range above about 0.1 micron and (3) the remainder thereof have average diameters in the range below 0.15 mm. Preferably, the particle sizing is diverse and of a wide range of average diameters. An especial advantage of the catalyst and preparation herein is that no special screening or selection of particularly sized fractions is necessary for the preparation of a satisfactory catalyst. By average diameter as used herein is meant by definition the geometrical average diameter obtained for an irregularly shaped particle.

The size (average diameter) of the catalyst pack herein may vary widely, depending upon the contemplated use, for example, as in fixed bed, fluid bed, or slurry reaction usage. Broadly, the more useful packs will be sized in the diameter range from about 0.5 mm to 15 mm, preferably 3 to 10 mm.

An especial advantage of the catalyst of the invention is that the rigid pack, cluster or bunch of particles may be sized as large as 10–13 mm in average diameter and larger without the serious diffusion limitation effects which forces refiners using conventional catalysts to use catalysts sized in the 0.79 (1/32 inch) mm to 1.58 (1/16 inch) mm diameter range, the serious problem re high back pressures and the like notwithstanding.

A further and special advantage of the catalyst of the invention is that a mixture of two or more different kinds of particles having different catalytic activities may be used in the preparation of the catalyst pack or cluster herein, thereby yielding a catalyst having bi- or polymodal activity. For example, particles obtained by pulverizing a hydrodesulfurizing catalyst (as in U.S. Pat. No. 3,770,617) may be mixed with particles obtained by pulverizing a hydrocracking catalyst (as in U.S. Pat. No. 3,242,100) to produce a mixture of particles which is thereafter used in the catalyst preparation method herein. The resulting catalyst is bifunctional, and its use in processing sulfur-contaminated hydrocracking feedstocks is advantageous. It has also been found advantageous to include unloaded (i.e., substantially free of catalytic metal components) refractory oxide particles with pulverized particles of a hydrodesulfurizing catalyst (loaded particles) in a mixture used in the preparation of the catalyst herein. Other examples include the use of mixtures of two or more different kinds of particles, for example, in which (1) a portion is especially effective for hydrodenitrifying and a portion is especially effective for hydrodemetalizing a hydrocarbon feedstock, (2) a portion has particular hydrodesulfurizing activity and a portion has particular isomerizating activity for a sulfur-contaminated hydrocarbon feedstock, (3) a portion is effective for hydrodenitrifying and a portion is effective for hydrodesulfurizing a contaminant hydrocarbon feedstock, (4) a portion is effective for hydrogenating and a portion is effective for hydrocracking a hydrocarbon feedstock, or (5) and the like mixtures of particles having different catalytic activities either with or without an additional portion of unloaded refractory oxide particles. The use of mixtures of two, three or more different kinds of catalytic (loaded) particles is contemplated herein either with or without one or more kinds of unloaded refractory oxide particles for the preparation of the pack, cluster or the like catalyst composition herein. Additionally, a portion of particles having desirable and selective absorptive properties for undesirable feed and/or product components, such as thiols, nitrogen-containing compounds, and the like may also be included in the particle mixtures herein.

Catalyst Preparation

The catalyst of the invention may be prepared by any suitable method.

In a novel method for the preparation of the porous catalyst of the invention a combination of prerequisites must be met: (1) a suitable pulverable solid, (2) a suitable cohesive component, and (3) water are required. In addition to the foregoing requirements, the production of a satisfactory catalyst or carrier, the latter being used as an intermediate in the preparation of the catalyst herein, is dependent upon the relative amounts of the pulverized solid, the cohesive component and water which are used to prepare an intermediate dough-like composite. The composite is then shaped, dried and calcined to remove volatilizable fractions thereof, thereby yielding the desired catalyst or a carrier for the desired catalyst depending upon the pulverable solid used as will be clear from the description to follow.

In one method the catalyst of the invention is prepared using particles comprising a refractory oxide component which is impregnated with the hydrogenating component or a precursor thereof. In this case, at the completion of the drying and calcining steps noted above, the preparation of the catalyst in the oxide form is essentially complete. Additional steps, including conventional sulfiding separately or in use and contact with hydrogen gas and a hydrocarbon feedstock, suffice to produce other forms thereof.

In a second method the catalyst of the invention is prepared using particles comprising a refractory oxide which requires the addition of at least one hydrogenation component or a precursor thereof in order to complete the desired catalyst. In this case, at the completion of the drying and calcining step an impregnation step is required in which one or more hydrogenating components or precursors thereof are introduced into the composition which is then dried and calcined. Where the particles used in the catalyst preparation comprise only a refractory oxide component, the dried and calcined intermediate is a new and unique composition, a catalyst carrier, suitable for use in the production of hydrocarbon conversion catalysts, for example, hydrotreating, hydrocracking, hydrodemetalizing, hydrodesulfurizing, hydrodenitrifying, catalytic cracking and hydroisomerizing catalysts and the like. This carrier material is a yet further aspect of the present invention.

In a yet further method, the catalyst of the invention is prepared using the cogellation method, for example see U.S. Pat. No. 3,242,100, for the preparation of a conventional intermediate. The intermediate is then pulverized and the resulting mixture of particles is used to furnish the particles required in the preparative method herein.

The particles used in the preparation may be obtained by any suitable method, for example by pulverizing a catalyst or a catalyst carrier containing the requisite refractory (i.e., a material that is slow to soften and resists heat) oxide. These particles must be sufficiently stable form-wise that they suffer little or no deformation during the dough forming and shaping steps of the preparation method herein. In general, this requirement is satisfied where the particles are pulverable. As described above, the particles should have average diameters in the range below 1.3 mm. Desirably a substantial fraction of the particles in a mixture thereof used to prepare the dough-like intermediate herein have average diameters in the range from about 0.1 to 15 microns. This fraction, in terms of volume contribution to the mixture, may vary widely and for preparation of a satisfactory pack of particles is usually in the range 10 to 90, more often 15 to 75 percent, of the total volume of the mixture of particles.

Representative solids suitable for use in preparing the particles required herein, for example by pulverizing and, if desired, screening the solid, include conventionally prepared porous hydroconversion catalysts and suitable porous carriers therefore having the requisite content of refractory oxide, or refractory oxide plus hydrogenating component. These catalysts or carriers may be newly prepared, partially used, used and regenerated in full or part by conventional means or the like.

Representative prior art catalysts suitable as a source of the pulverized solid for use herein, includes:

|     | Hydroconversion | Catalyst Type | Reference |
| --- | --- | --- | --- |
| (1) | Isomerizing | $Al_2O_3$-Zeolite | U.S. Pat. No. 3,723,552 |
| (2) | Hydrocracking | Group VIII & Amorphous Alumino silicate | U.S. Pat. No. 3,769,235 |
| (3) | Cracking | Silica-Alumina | U.S. Pat. No. 2,870,082 |
| (4) | Hydrodenitrifying | Ni—Mo—$Al_2O_3$ | U.S. Pat. No. 3,114,701 |
| (5) | Hydrocracking | Sulfided Ni—Co— Support | U.S. Pat. No. 3,166,491 |

-continued

| | Hydroconversion | Catalyst Type | Reference |
|---|---|---|---|
| (6) | Hydrotreating | Reactivated Hydrodenitrifying | U.S. Pat. No. 3,172,864 |
| (7) | Hydrocracking | Cogelled Silica-Alumina | U.S. Pat. No. 3,242,100 |
| (8) | Hydrocracking | Xerogel Plus Group VIII | U.S. Pat. No. 3,243,368 |
| (9) | Hydrocracking | Fluorided Hydrocracking | U.S. Pat. No. 3,325,396 |
| (10) | Hydrocracking | Modified $SiO_2$—$Al_2O_3$ Cracking | U.S. Pat. No. 3,328,291 |
| (11) | Hydrocracking | Ni—W Promoted $SiO_2$—MgO Base | U.S. Pat. No. 3,333,216 |
| (12) | Hydrotreating | Metal Phosphate Modified | U.S. Pat. No. 3,493,517 |
| (13) | Hydroconversion | Zeolite-Matrix-Group VIII | U.S. Pat. No. 3,535,225 |
| (14) | Hydrodesulfurizing | Group VI & VIII-$Al_2O_3$ | U.S. Pat. No. 3,770,617 |
| (15) | Hydroprocessing | Silica Modified $Al_2O_3$-Groups VI & VIII | U.S. Pat. No. 3,692,698 |
| (16) | Hydroforming | Pt on $Al_2O_3$ | U.S. Pat. No. 2,973,330 |
| (17) | Reforming | Pt-Re-$Al_2O_3$ | U.S. Pat. No. 3,415,737 | and the like conventional prior art catalysts.

In the preparation of the dough-like material which is an intermediate in the catalyst preparation method herein, and in addition to the particles and water employed, an organic cohesive component is required. The action of this component in the preparation of the catalyst composition herein is not clearly understood. However, on the basis of empirical results and when used in particular relative amounts, excellent adhesion is produced between the particles of the pack by the adhesive component although at the completion of the calcining step there is no appreciable residue or remainder thereof in the composition. The resulting composition is a rigidly interconnected pack of particles. In stark and surprising contrast, when too much or too little of the adhesive component is used to prepare the dough-like mixture, the resulting composition is wholly unsatisfactory; for example, when too much is used, a powdery mass of particles is recovered.

Organic compounds suitable for use herein are, in general, hydrocolloid-forming compounds and such compounds are contemplated for use. These are natural or synthetic compounds which comprise carbon, hydrogen and oxygen, and may also contain, relative to carbon, a minor amount of one or more other elements such as nitrogen, halogen and the like, and (1) swell and form a colloid when contacted with water, (2) have a molecular weight in the range above about 1000 and (3) exhibit ordinary inter- and intra-molecular hydrogen bonding and viscosity enhancing effects in aqueous media.

Representative hydrocolloid forming compounds include wheat flour, corn starch, guar gum and ordinary derivatives thereof, polysaccharide gums, such as Xanthan gum, and the like, locust bean gum, methyl vinyl ether/maleic anhydride polymers, acrylic resins and the like hydrocolloid forming compounds. Corn starch and wheat flour are preferred because of their relatively low cost and effective adhesive promoting action. On the other hand, the use of hydrocolloid-forming materials such as guar, Xanthan and locust bean gums is advantageous, despite their relatively high cost because they are effective cohesive agents at very low use levels, for example in the range 0.1 to 1 weight percent of the water used. At these levels the removal of organic residue from the catalyst presents no particular problem re temperature control as in a burn out.

When present in the precursor mixture in the required amount, the hydrocolloid-forming organic compound promotes cohesion of the pulverized solid. It also, in at least some degree, aids in extruding or shaping of the dough-like intermediate. The preparation of a satisfactory catalyst or precursor carrier therefore is dependent upon the amounts of hydrocolloid-forming organic compound and water relative to the pulverized solid which may be present in the dough-like intermediate. If too much of the hydrocolloid-forming organic compound is used, a powder rather than a cohesive solid is recovered after the drying and calcination. If too little of the organic compound is used (1) little or none of the required interparticle cohesive effect and liquid viscosity enhancing effect results, and (2) where extrusion is to be employed in the shaping, it is also more or less impossible to extrude the mass. If too much water and a satisfactory amount of the hydrocolloid-forming compound are used, the resulting composition has a macropore volume fraction which is excessive, and the crush strength of the resulting solid is poor. If too little water and a satisfactory amount of the hydrocolloid-forming compound are used, the macropore content of the resulting solid is unsatisfactory.

The relative amount of water and hydroforming organic compound required for use in the preparation of the dough-like intermediate varies depending upon several factors, including the specific pulverized solid used, and its pore volume, upon the specific hydrocolloid-forming organic compound used and upon the amount of water used. In general, a satisfactory amount of water is sufficient for complete imbibation of water by the solid plus sufficient to produce a plastic dough, for example, suitable for extruding or forming a thick film thereof. This is usually an amount of water, in parts by volume per 100 parts of the solid component, in the range 30 to 200 parts, preferably for porous particles, an amount in the range 80 to 200 parts, and more preferably 80 to 125 parts. In general, a satisfactory amount of the cohesive component based in parts by weight upon 100 parts water is in the range 0.2 to 30 parts, preferably 1 to 15 parts, and more preferably 2 to 10 parts.

The order of the mixing of the components of the dough-like intermediate is not critical. Usually, it is more convenient to premix the solids and then add the water. It is also convenient to add sufficient water for imbibation by the pulverized solid, then admix the organic hydrocolloid-forming compound, and finally the balance of the water required to form an extrudable or satisfactory mix. Alternatively, a mixture of water plus the hydrocolloid-forming compound may be added to the water-imbibed solid or dry solid.

The dough-like composite may be shaped by any suitable method, for example by (1) extruding, cutting, if necessary, and drying; (2) drying, pulverizing and screening; (3) or the like. The extrusion method is preferred. The particle packs, clusters, etc., produced herein may be sized to any combination of dimensions normally employed for catalysts employed in hydrocarbon hydroprocessing for fixed or fluid bed or slurry-type operation. An especial advantage of the catalyst of the invention is that it may be sized in packs as large as 7 mm and larger in diameter and used without the serious pressure drop and diffusion limitation problems normally encountered by the use of the 0.076 mm sized catalyst particles suggested for use for heavy hydrocarbon feedstocks (see U.S. Pat. No. 3,562,800).

The Hydrogenation Component

A wide variety of hydrogenation components is satisfactory for inclusion in the catalyst herein. These, in general, are the oxides, sulfides and metals of the elements of Groups VIB and VIII of the Periodic Chart of the Elements and of vanadium. One or more of these may be present. Representative components include vanadium, molybdenum, tungsten, cobalt, nickel and palladium and the like in one or more of the several forms listed above. The combinations of cobalt and molybdenum or tungsten, or of nickel and molybdenum or tungsten, are preferred. An effective amount of the hydrogenation component is, in general, in the range 0.1 to 50 weight percent, based upon the oxide carrier and calculated as metal. In addition, a minor amount of a promoter or stabilizer such as phosphorus, rhenium or the like may be present in the catalyst in an effective amount, for example, an amount in the range 0.1 to 10 weight percent based upon the oxide carrier and calculated as the element.

The particular hydrogenation component desirably present in the catalyst of the present invention will depend upon the particular hydrocarbon conversion or hydrotreating or hydroconversion(s) desired. For example, for demetalation service, cobalt and molybdenum or tungsten are especially suitable, as are also nickel and molybdenum or tungsten. For hydrocarbon saturation and/or reforming service, depending upon the process conditions employed, a Group VIII noble metal hydrogen component is especially suitable. Similarly, conventional process conditions and hydrogenation components especially suitable for hydrodesulfurizing, hydrocracking and the like, hydroconversion processes may be used.

Process Conditions

The conditions suitable for use with the catalyst compositions of the invention vary widely depending upon a number of variables, including (1) the feed, (2) the hydrotreatment or processing desired and (3) the conversion desired. In general satisfactory conditions include contacting the catalyst with the feed in the liquid and/or the gaseous state and with hydrogen as follows:

| | |
|---|---|
| Temperature, °C | 200–540 |
| Total pressure, atm. | 1–300 |
| Hydrogen partial pressure, atm. | 0–200 |
| Hydrogen rate, SCL/L | 0–9000 |
| Liquid Hourly Space Velocity, V/V/Hr. | 0.1–25 |

Feedstock

The catalyst of the invention is useful for the treating of any suitable hydrocarbon feedstock. It is especially useful for the hydrotreating or hydroprocessing of feedstocks containing at least an appreciable amount of high-molecular components, for example at least 5 weight percent, preferably at least 10 percent. Diffusion limitation problems, in general, become increasingly troublesome with increasing molecular weight of the feedstock. Other factors involved include molecular configuration and the like. By the term "high molecular weight" as used herein is meant molecular weight corresponding to hydrocarbons having a normal boiling point of at least 315° C.

Representative feedstocks contemplated for use herein include whole crude oils, fractions of crude oils such as atmospheric gas oils and residua or vacuum gas oils and residua, processed fractions thereof, especially those oils having initial boiling points above 315° C or which contain at least a 5 weight percent component boiling above 315° C and the like. Other representative feedstocks include coal-derived oils, shale oils and the like oils. Yet another representative feedstocks include slurries of liquefiable or partially liquefiable finely divided solids in oil, such as creosote oil, and oils containing suspended solids. Feedstocks which contain an appreciable content (at least 10 ppm, weight) of metals contaminants normally present in crude oil are especially advantageously treated in a hydrotreating process employing the catalyst herein. Metal contaminated petroleum derived feedstocks are preferred for use herein.

EXAMPLES

The examples described below are presented for the further illustration, but not the limitation of the claimed invention.

EXAMPLE 1

Comparative tests were made as between a conventional hydrocarbon demetalation catalyst and a catalyst of the invention. The active components, hydrogenation agents and micropore distribution for the catalysts were essentially identical. Thus, an aliquot of the prior art catalyst was pulverized and used to prepare a catalyst in the manner described above. The hydrogenation component was cobalt (3 weight percent) and molybdenum (10 weight percent) oxides, sulfides and/or metal conventionally present in a hydrocarbon demetalation catalyst supported on alumina (76 weight percent). The essential difference between the catalysts is believed to be the macropore (pores having a diameter in the 0.1 to 15 micron range) contents as follows:

| | Prior Art (A) | Present (B) |
|---|---|---|
| Total pore volume, cc/ml | 0.61 | .67 |
| Pore volume in macropores, cc/ml | <.02 | .22 |
| Port volume in pores of a diameter 80–150 Angstroms, % | >97 | 68 |

For the tests, aliquots of each catalyst sized in the 8/14 mesh range were charged as a fixed bed to a microreactor suitably fitted for operational control of the other process variables. The feed was a heavy Arabian atm. residua having the following characteristics:

| Metals Content | |
|---|---|
| Vanadium, ppm | 78 |
| Nickel, ppm | 22 |
| Sulfur content, wt. % | 3.85 |
| Asphaltenes (Hot Heptane Insoluble), wt. % | 6.1 |
| 538° C + fraction, wt. % | 45.54 |

The conditions employed for the hydroconversion were:

| Temperature, ° C | 382–399 |
|---|---|
| Pressure, atm. | 124 |
| H$_2$ rate, StdL/ml of feed | 1.8 |

First order reaction rates were calculated for a temperature of 399° C using the data obtained in the runs: (1) on the volumetric basis and per unit weight of the active catalyst; (2) using the liquid hourly space velocity (LHSV) of the 538° C fraction of the feed; and (3) using identically sized catalysts of 8/14 mesh as follows:

| Hydroconversion Reaction | Volumetric Reaction Constant, K Catalyst | |
|---|---|---|
| | A | B |
| Vanadium removal | 0.33 | 0.63 |
| Nickel removal | 0.26 | 0.39 |
| Sulfur removal (desulfurization) | 0.59 | 0.42 |
| Asphaltene removal (hydrogenation) | 0.23 | 0.69 |
| 538° C+ removal (hydrocracking) | 0.11 | 0.07 |

These data demonstrate that the catalyst herein is remarkably effective for the removal of metal contaminants from a heavy hydrocarbon feedstock. At the same time it exhibits other substantial hydrocarbon hydroconversion activities, such as for hydrodesulfurization, hydrogenation, hydrocracking and the like. By varying the process conditions, for example, the temperature, pressure and the like, these activities may be enhanced or reduced as desired. Thus, in general, the instant catalyst is useful as a catalyst for heavy hydrocarbons (i.e. hydrocarbons boiling at a temperature above 315° C and containing ordinary organo-metallic impurities) hydroconversion (hydroprocessing) reactions which are carried out under conditions, including:

(1) a temperature in the range from about 200° to 540° C;

(2) a system pressure in the range from about 1 to 300 atmospheres;

(3) a hydrogen partial pressure in the range from about 0 to 200 atmospheres; and (4) a liquid hourly space velocity in the range from about 0.1 to 25 V/V/Hr.

These data also demonstrate that the catalyst herein, having a substantial macropore content, exhibits a remarkable hydrogenation activity for asphaltenes (hot heptane insoluble hydrocarbons) and the like. In conventional practice, where a feed has a high asphaltene content, a deasphalting step is frequently employed before a hydrogenation treatment, which step normally reduces the liquid yield of hydrocarbons from the feed, because of catalyst fouling, short life and the like problems. The present catalyst permits a hydrogenative treatment of a highasphaltene content feed without a prior deasphalting step. Subsequently, if desired, a deasphalting step may be used to remove residual asphalt and associated metals with a resulting relatively higher liquid yield than when deasphalting is first applied without a prior hydrogenative treatment.

EXAMPLE 2

Catalyst B above was tested for its metal loading capacity using a Gach Saran heavy hydrocarbon residua (sulfur content, 2.6 weight percent; nitrogen content, 0.4 weight percent; Ni, 37 ppmw; V, 119 ppmw; Fe, 4 ppmw; Ramsbottom carbon, 7.3 weight percent; asphaltenes, 6 weight percent) under the following conditions:

| Temperature, ° C | 382–432 |
|---|---|
| Pressure, atms. | 178 |
| H$_2$ rate, SL/ml of feed | 1.78 |
| LHSV | 2.2 |

After 425 hours onstream this catalyst had demonstrated a metals-loading capacity of 0.10 g/cc of catalyst. The prior art catalyst A, in the same test at the end of run (425 hours) exhibited a metals-loading capacity of 0.06 g/cc of catalyst. It was shown from the above run that at the end-of-run catalyst B after 1048 hours exhibited a final capacity of about 0.238 g/cc. Catalyst B exhibited a metals capacity superiority over catalyst A by a factor of about 3.

Catalyst B was also checked for its effectiveness factor for vanadium removal. (See article entitled "Intraparticle Diffusion Effects In Residue Hydrodesulfurization" by Shah & Parokos, I & E.C., Vol. 14, No. 4, 1975, re effectiveness factor) which was found to be 0.486 at the reactor inlet. Catalyst A exhibited an effectiveness factor of 0.19 for vanadium removal at the reactor inlet. FIGS. 2A, 2B and 3 provide comparative data on (1) the volumetric distribution of vanadium and nickel and (2) activity and metals capacity for catalyst A and for a representative catalyst of the invention.

FIG. 4 provides comparative data for a used catalyst of the invention showing pore diameter distributions of the pores and pore volume relative to the front, middle and exit fractions of a catalyst bed. These data demonstrate that there is little or no change in the pore volume which is in macropores (0.1 to 7 micron diameter) in use of the catalyst and in going through the bed. Thus, little or none of the metals or carbon deposition occurs in the macropores. Conversely, the macropores are shown to be available for effective access purposes throughout the life of the catalyst.

These data demonstrate the substantial advantages of the instant catalyst over a representative catalyst of the prior art.

EXAMPLE 3

A catalyst, C, was prepared and tested as in Example 1 except that the hydrogenation component comprised nickel and molybdenum in a coprecipitated cogel of silica-alumina containing titania and phosphorus. It had a pore volume of which about 0.6 cc/cc of which 37% was in pores having a diameter in the 0.1 to 15 micron range. Less than about 0.06 cc/cc of the pore volume was in pores having a diameter of less than 40 Angstroms. The results obtained for the first order reaction rate constants per unit volume of active catalyst for 399° C were determined and found to be as follows:

| CATALYST C | |
|---|---|
| Hydroconversion Reaction | Volumetric Reaction Constant, K |
| Demetalation | |
| Vanadium removal | 0.63 |
| Nickel removal | 0.23 |
| Desulfurization | 0.40 |
| Hydrogen | |
| Asphaltene removal | 0.51 |
| Hydrocracking | |
| 538° C+ removal | 0.10 |

These data further demonstrate advantages of the instant catalyst.

EXAMPLE 4

A catalyst was prepared using the same materials as were used for the preparation of catalyst C in Example 3 above by steps including extruding and calcining to yield a 1.78 mm diameter catalyst having a 35 percent macropore content. It was then tested using the same feed and conditions as were used in Example 2 except that in this example the conditions were adjusted to produce a product containing 0.5 weight percent sulfur as in the case for catalyst A in Example 1. Catalyst B was designed to preferentially remove metals, whereas catalyst A of Example 1 is a prior art catalyst which was designed to preferentially remove sulfur. The comparative metals level for the products were as follows:

| | V, ppm | Ni, ppm | Reactor, Vanadium Loading 425 Hrs., cc/cc |
|---|---|---|---|
| Catalyst A | 40 | 14 | 0.06 |
| Catalyst B | 10 | 6 | 0.10 |

These data demonstrate that the inclusion of a substantial fraction of macropores in the pore volume of a catalyst also markedly upgrades the performance for sulfur removal by a metals-removing catalyst.

EXAMPLE 5

Pulverized solid from a prior art catalyst as in Example 1 was used in a preparation by the method herein. The cohesive agent was guar gum (commercial designation A-40-F) powder of which 20 grams thereof were admixed into 980 grams of the pulverized catalyst followed by 750 grams of water. The resulting mixture was maintained at about 100° C for about 15 minutes during which time thorough mixing was effected. The catalyst was completed by extruding, and drying and calcining to constant weight by heating at about 454° C. The resulting catalyst had the following characteristics:

| Total Pore Volume, cc/cc | .66 |
|---|---|
| Micropore Pore Volume, cc/cc | .48 |
| Macropore Pore Volume, cc/cc | .18 |
| Crush Strength | Very Good |

EXAMPLE 6

Pulverized solid, 90 grams, from a prior art catalyst as in Example 1 was admixed with 10 grams of iron oxide powder, 10 grams of wheat flour and 55 grams of water. The resulting mixture, which was extruded, dried and calcined, had the following characteristics:

| Total Pore Volume, cc/cc | .64 |
|---|---|
| Micropore Pore Volume, cc/cc | .42 |
| Macropore Pore Volume, cc/cc | .22 |
| Mean Diameter of Macropores, microns | .46 |

EXAMPLE 7

In a manner analogous to Example 6, a series of catalysts were prepared using the prior art catalyst of Example 1 except that in place of the iron oxide diluent or modifier, the following, in powdered form, were used: (1) a crystalline aluminosilicate (molecular sieve), (2) calcined alumina, (3) amorphous silica or (4) processed diatomaceous earth (Celite). In each case the resulting catalyst contained a satisfactory amount of access (macro) pores. The micropores thereof in the main corresponded to that for the prior art catalyst plus a contribution from the modifier which varied from little or none to an appreciable contribution depending upon the modifier. For example, in the case where the zeolite sieve was added, the micropore fraction of the pore volume contained a material amount of pores in the 6 to 10 Angstrom diameter range. The resulting catalyst had an enhanced hydrocarbon cracking activity as well as the other hydroconversion reaction activities noted for the catalyst of Example 1.

EXAMPLE 8

In this example a prior art hydrocracking catalyst was pulverized and a 90 gram portion was mixed with 10 grams of wheat flour and 65 grams of water followed by mixing, extruding and drying and calcining. The prior art catalyst prior to use had the following weight percent composition:

| Nickel | 10 |
|---|---|
| Molybdenum | 12 |
| Phosphorous | 3 |
| Titanium | 7 |
| Silica | 13 |
| Alumina | 31 |
| Oxygen | Balance; | and characteristics:

| and characteristics: | |
|---|---|
| Bulk density, g/cc | .902 |
| Pore volume, cc/cc | .562 |
| Surface Area, m²/g | 273 |
| Average Pore Dia., Angstroms | 57 |

The resulting catalyst had a bulk density of 0.594 g/cc and approximately 33 percent of its pore volume was in macropores, i.e., access pores. In a pilot plant run of 64.4 hours at 399° C it demonstrated excellent hydrocarbon hydroconversion activities.

EXAMPLE 9

In this example a prior art hydrodenitrification catalyst comprising nickel and tungsten disposed upon a titania modified silica-alumina base was pulverized and converted to a macroporous catalyst as in Example 1. Relative to the prior art catalyst, the resulting catalyst exhibits reduced diffusion limitation effects and at the same time a satisfactory hydrodenitrification activity.

What is claimed is:

1. A catalyst composition comprising a rigidly interconnected pack of irregularly shaped particles of which (1) less than 5 weight percent thereof have average diameters in the range 0.15 to 1.3 mm, (2) at least 10 weight percent thereof have average diameters in the range above 0.1 micron and (3) the remainder thereof have average diameters in the range below 0.15 mm, said pack having a pore volume of at least 0.065 cc per cc of the pack and having access channels among said particles throughout the pack, said channels comprising interconnected macropores having diameters as measured by mercury porosimetry in the range 0.1 to 15 microns, and said macropores contributing a fraction of said pore volume, which is in the range from about 3 to 45 percent of said pore volume; said particles comprising pulverable materials selected from the group consisting of at least one refractory oxide component and at least one hydrogenating component, said refractory oxide component being further selected from the group consisting of the oxides of the metals of Groups II, III and IV, said hydrogenating component being further selected from the group consisting of the metals, oxides and sulfides of the elements of Groups VIB and VIII; and said composition containing, in parts by weight, for each 100 parts of said refractory oxide component an amount of said hydrogenating component, calculated as metal, in the range from about 0.1 to 50 parts.

2. A composition as in claim 1 further characterized in that (1) the pore volume of said pack is in the range 0.065 to 0.8 cc per cc of the composition, (2) said interconnected macropores have average diameters in the range 0.2 to 10 microns and contribute a fraction of the pore volume which is in the range 5 to 30 percent thereof, (3) said refractory oxide component contains at least 10 weight percent of alumina, and (4) said amount of hydrogenating component is in the range 0.1 to 30 parts.

3. A composition as in claim 1 further characterized in that (1) the pore volume of said pack is in the range 0.3 to 0.6 cc per cc of the composition, (2) said interconnected macropores have average diameters in the range 0.2 to 5 microns and contribute a fraction of the pore volume which is in the range 10 to 20 percent thereof, and (3) said refractory oxide component contains at least 25 weight percent of alumina.

4. A composition as in claim 1 further characterized in that said refractory oxide component consists essentially of alumina.

5. A composition as in claim 4 further characterized in that said hydrogenating component contains at least one element selected from the group consisting of molybdenum, tungsten, cobalt and nickel.

6. A composition as in claim 1 further characterized in that said pack is sized in the range from about 0.5 to 15 mm.

7. A composition as in claim 1 further characterized in that said composition has polymodal catalytic activity and said particles comprise two or more different kinds of particles having different hydrocarbon hydroprocessing catalytic activities.

8. A composition as in claim 1 further characterized in that said pack contains a minor portion of refractory oxide particles substantially free of said hydrogenating component, unloaded particles, said unloaded particles being sized in the same range as said irregularly shaped particles.

9. A method for preparing the catalyst composition of claim 1, comprising the steps:

(1) preparing a dough-like mixture by admixing water, a cohesive component and a pulverable solid component, said mixture, based upon 100 parts of the solid in parts by volume thereof, containing an amount of water in the range from about 30 to 200 volume, and an amount of the cohesive component, based on parts by weight per 100 parts of water, in the range from about 0.2 to 30 parts; said cohesive component being selected from the group consisting of organic hydrocolloid-forming compounds and mixtures thereof having a molecular weight above about 1000, and comprising carbon, hydrogen and oxygen, said solid component comprising a mixture of irregularly shaped pulverable particles of which (1) less than 5 weight percent have average diameters in the range 0.15 to 1.3 mm, (2) at least 10 weight percent have average diameters in the range above about 0.1 micron, and (3) the remainder have average diameters in the range below 0.15 mm, said particles comprising materials selected from the group consisting of at least one refractory oxide component and at least one catalytic agent component or precursor thereof, said refractory oxide component being further selected from the group consisting of the oxides of the metals of Groups II, III and IV, said catalytic agent or precursor thereof being further selected from the group consisting of at least one of the elements of the Groups I, V, VI, VII and VIII and compounds thereof; and said solid component containing, in parts by weight, for each 100 parts of said refractory oxide component, an amount of said catalytic agent component or precursor thereof, calculated as the element, in the range from about 0.1 to 50 parts;

(2) shaping said dough-like mixture; and (3) drying and calcining the shaped mixture at a temperature in the range 20° C to 950° C.

10. A method as in claim 9 further characterized in that (1) said particles are porous, (2) said amount of water is in the range 80 to 200 parts, (3) said amount of cohesive component is in the range 1 to 15 parts, and (4) said refractory oxide component contains at least 10 weight percent of alumina.

11. A method as in claim 9 further characterized in that (1) said particles are porous, (2) said amount of water is in the range 80 to 125 parts, (3) said amount of cohesive component is in the range 2 to 10 parts, and (4) said refractory oxide component consists essentially of alumina.

12. A method as in claim 10 further characterized in that said particle sizing is diverse and of a wide range of average diameters.

13. A method as in claim 11 further characterized in that said catalytic agent or precursor thereof is selected from Groups VIB and VIII.

14. The composition produced by the method of claim 13.

15. A method for preparing the catalyst composition of claim 1, comprising the steps:

(1) preparing a dough-like mixture by admixing water, a cohesive component and a solid pulverable component, said mixture, based upon 100 parts of the solid in parts by volume thereof, containing an amount of water in the range from about 30 to 200 volumes, and an amount of the cohesive component, based on parts by weight per 100 parts of water, in the range from about 0.2 to 30 parts; said cohesive component being selected from the group consisting of organic hydrocolloid-forming compounds and mixtures thereof having a molecular weight above about 1000, and comprising carbon, hydrogen and oxygen, said solid component comprising a mixture of irregularly shaped pulverable particles of which (1) less than 5 weight percent have average diameters in the range 0.15 to 1.3 mm, (2) at least 10 weight percent have average diameters in the range above about 0.1 micron, and (3) the remainder have average diameters in the range below 0.15 mm, said particles comprising materials selected from the group consisting of at least one refractory oxide component selected from the group consisting of the oxides of the metals of Groups II, III and IV;

(2) shaping said dough-like mixture;

(3) drying and calcining the shaped mixture at a temperature in the range 20° C to 950° C;

(4) impregnating the dried and calcined mixture by conventional means, thereby introducing into the composition a catalytic amount of a hydrogenating component or a precursor thereof selected from the group consisting of the metals, oxides and sulfides of the elements of Groups I, V, VI, VII and VIII, said amount, in parts by weight, for each 100 parts of said refractory oxide component, being in the range from about 0.1 to 50 parts; and (5) drying and calcining the impregnated mixture at a temperature in the range 20° C to 950° C.

16. The composition produced by the method of claim 15 wherein said hydrogenating component contains at least one element selected from Groups VIB and VIII and said refractory oxide component consists essentially of alumina.

17. The composition of claim 16 further characterized in that said pack contains a minor portion of refractory oxide particles substantially free of said hydrogenating component, unloaded particles, said unload particles being sized in the same range as said irregularly shaped particles.

18. A method as in claim 15 further characterized in that (1) said particles are porous, (2) said amount of water is in the range 80 to 200 parts, (3) said amount of cohesive component is in the range 1 to 15 parts, and (4) said refractory oxide component contains at least 10 weight percent of alumina.

19. A method as in claim 15 further characterized in that (1) said particles are porous, (2) said amount of water is in the range 80 to 125 parts, (3) said amount of cohesive component is in the range 2 to 10 parts, and (4) said refractory oxide component consists essentially of alumina.

20. A method as in claim 9 further characterized in that (1) said cohesive component is at least one hydrocolloid-forming compound selected from the group consisting of wheat flour, cornstarch, guar gum, ordinary guar gum derivatives, polyaccharide gums, methyl vinyl ether/maleic anhydride polymers, and acrylic resins.

21. A method as in claim 20 further characterized in that said cohesive component is wheat flour.

22. A method as in claim 20 further characterized in that said cohesive component is cornstarch.

23. A method as in claim 15 further characterized in that (1) said cohesive component is at least one hydrocolloid-forming compound selected from the group consisting of wheat flour, corn starch, guar gum, ordinary guar gum derivatives, polyaccharide gums, methyl vinyl ether/maleic anhydride polymers and acrylic resins.

24. A method as in claim 15 further characterized in that said cohesive component is wheat flour.

25. A method as in claim 9 further characterized in that said particles are obtained by pulverizing a used catalyst.

26. A method as in claim 15 further characterized in that said particles are obtained by pulverizing a used catalyst.

27. A method as in claim 9 further characterized in that said particles are obtained by pulverizing a conventional hydrocarbon hydroprocessing catalyst.

28. A method as in claim 15 further characterized in that said particles are obtained by pulverizing a conventional hydrocarbon hydroprocessing catalyst.

29. A catalyst composition comprising a rigidly interconnected pack of irregularly shaped pulverable particles of which (1) less than 5 weight percent thereof have average diameters in the range 0.15 to 1.3 mm, (2) at least 10 weight percent thereof have average diameters in the range above 0.1 micron and (3) the remainder thereof have average diameters in the range below 0.15 mm, said pack having a pore volume of at least 0.065 cc per cc of the pack and having access channels among said particles throughout the pack, said channels comprising interconnected macropores having diameters as measured by mercury porosimetry in the range 0.1 to 15 microns, and said macropores contributing a fraction of said pore volume, which is in the range from about 3 to 45 percent of said pore volume; said particles comprising materials selected from the group consisting of at least one refractory oxide component and at least one hydrogenating component, said refractory oxide component being further selected from the group consisting of the oxides of the metals of Groups II, III and IV, said hydrogenating component being further selected from the group consisting of the metals, oxides and sulfides of at least one element selected from the group consisting of molybdenum, tungsten, iron, cobalt, nickel, vanadium, platinum and palladium; and said composition containing, in parts by weight, for each 100 parts of said refractory oxide component an amount of said hydrogenating component, calculated as metal, in the range from about 0.1 to 50 parts.

* * * * *